(12) United States Patent
Yew et al.

(10) Patent No.: US 7,037,624 B2
(45) Date of Patent: May 2, 2006

(54) ELECTROLYTE FOR LITHIUM BATTERY, METHOD OF PREPARING THE SAME, AND LITHIUM BATTERY COMPRISING SAME

(75) Inventors: Kyoung-Han Yew, Suwon-si (KR); Eui-Hwan Song, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/092,539

(22) Filed: Mar. 28, 2005

(65) Prior Publication Data

US 2005/0214649 A1    Sep. 29, 2005

(30) Foreign Application Priority Data

Mar. 29, 2004 (KR) ...................... 10-2004-0021171

(51) Int. Cl.
*H01M 10/40* (2006.01)

(52) U.S. Cl. .................. 429/332; 429/324; 429/326; 429/330

(58) Field of Classification Search ...................... None
See application file for complete search history.

(56) References Cited

U.S. PATENT DOCUMENTS

| 5,709,968 | A |  | 1/1998 | Shimizu |
| 5,879,834 | A |  | 3/1999 | Mao |
| 6,664,008 | B1 | * | 12/2003 | Suzuki et al. ............... 429/337 |
| 2005/0008940 | A1 | * | 1/2005 | Adachi et al. ............. 429/327 |
| 2005/0019671 | A1 | * | 1/2005 | Han et al. ................... 429/328 |

OTHER PUBLICATIONS

Ishii, et al., "Electrolytic partial fluorination of organic compound. Part: 53 Highly regioselective anodic mono- and difluorination of 4-arylthio-1,3-dioxolan-2-ones. A marked solvent effect on fluorination product selectivity," Tetrahedron 57 (2001) pp. 9067-9072, no month.

* cited by examiner

*Primary Examiner*—John S. Maples
(74) *Attorney, Agent, or Firm*—Christie, Parker and Hale, LLP (57) ABSTRACT

An electrolyte for a lithium battery is disclosed. The electrolyte includes a non-aqueous organic solvent, a lithium salt, and at least one dioxolane-based additive.

26 Claims, 3 Drawing Sheets

ELECTROLYTE FOR LITHIUM BATTERY, METHOD OF PREPARING THE SAME, AND LITHIUM BATTERY COMPRISING SAME

CROSS REFERENCE TO RELATED APPLICATION

This application claims priority to and the benefit of Korean Patent Application No. 10-2004-0021171, filed on Mar. 29, 2004 in the Korean Intellectual Property Office, the entire content of which is incorporated herein by reference.

FIELD OF THE INVENTION

The present invention relates to an electrolyte for a lithium battery, a method for preparing the same, and a lithium battery comprising the same, and more particularly, to an electrolyte for a lithium battery to improve safety of the battery, a method for preparing the same, and a lithium battery comprising the same.

BACKGROUND OF THE INVENTION

The use of portable electronic instruments is increasing as electronic equipment gets smaller and lighter due to developments in the high-tech electronics industries. Studies on lithium secondary batteries are actively being pursued in accordance with the increased need for a battery having high performance and large capacity for use as a power source in these portable electronic instruments. Such a lithium secondary battery, having an average discharge potential of 3.7 V (i.e., a battery having substantially a 4 V average discharge potential) is considered to be an essential element in the digital generation since it is an indispensable energy source for portable digital devices such as cellular telephones, notebook computers, camcorders, etc (i.e., the "3C" devices).

Also, there has been extensive research on batteries for effective safety characteristics such as preventing overcharge. When a battery is overcharged, an excess of lithium ions is deposited on a positive electrode, and an excess of lithium ions is also inserted into a negative electrode to make the positive and negative electrodes thermally unstable. An eruptive explosion may occur from a decomposition of the electrolytic organic solvent, resulting in a thermal runaway which can cause serious safety concerns.

To overcome the above problems, it has been suggested that an aromatic compound such as an oxidation-reduction additive agent ("redox shuttle") may be added to the electrolyte. For example, U.S. Pat. No. 5,709,968 discloses a non-aqueous lithium ion secondary battery that prevents thermal runaway caused by an overcharge condition by using a benzene compound such as 2,4-difluoroanisole. U.S. Pat. No. 5,879,834 discloses a method for improving battery safety by using a small amount of an aromatic compound such as biphenyl, 3-chlorothiophene or furan, which is polymerized electrochemically to increase the internal resistance of a battery during unusual overvoltage conditions. Such redox shuttle additives increase the temperature inside the battery early due to the heat produced by the oxidation-reduction reaction, and close the pores of a separator through quick and uniform fusion of the separator to inhibit an overcharge reaction. The polymerization reaction of these redox shuttle additives consumes the overcharge current to improve battery safety.

However, since batteries with high capacity are required according to meet the needs of customers, the above additives for preventing overcharge are limited in their ability to satisfy the high level of safety requirements. Accordingly a novel additive and an electrolyte including the same to assure such safety requirement are desired.

SUMMARY OF THE INVENTION

In one embodiment of the present invention, a lithium battery electrolyte is provided that improves safety.

In another embodiment of the present invention, a method is provided for preparing a lithium battery electrolyte.

In yet another embodiment of the present invention, a lithium battery is provided including a lithium battery electrolyte.

According to the present invention, an electrolyte for a lithium battery is provided, wherein the electrolyte includes a non-aqueous organic solvent, a lithium salt, and an additive selected from the group consisting of the compounds represented by the following formulas (1) to (7):

(1)

(2)

(3)

(4)

(5)

-continued where X is NR where R is H or a $C_1$ to $C_5$ alkyl, S, O, $SO_2$, or SO; and Y is H, a halogen, a $C_1$ to $C_5$ alkyl, an alkoxy, or a $C_6$ to $C_{10}$ aryl.

In another embodiment of the invention, a lithium battery is provided including the above electrolyte; a positive electrode including a positive active material that can intercalate and deintercalate lithium ions; and a negative electrode including a positive active material that can intercalate and deintercalate lithium ions.

DETAILED DESCRIPTION

Figure 1:
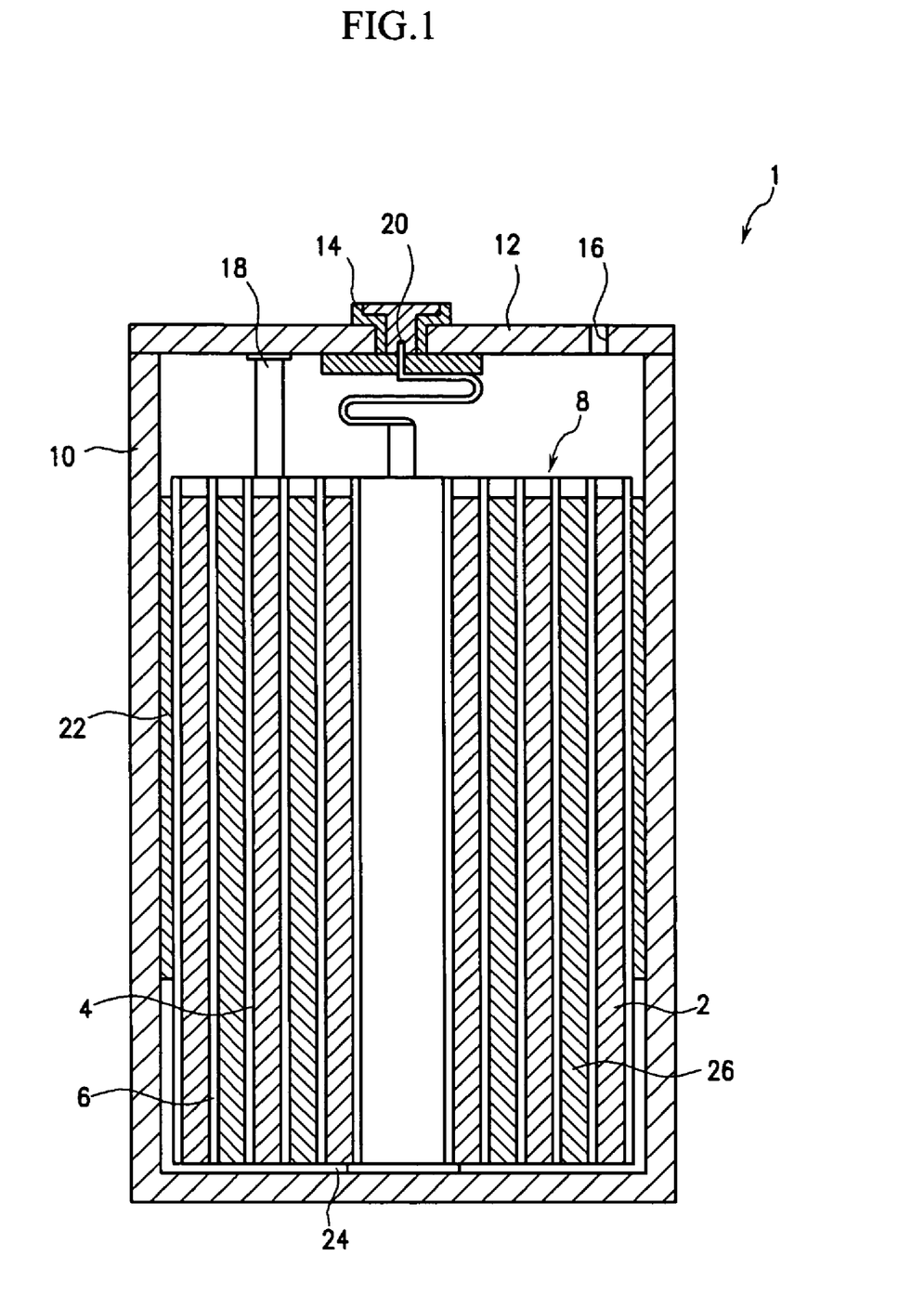
FIG. 1 is a schematic view of a lithium battery.

A schematic view of a general non-aqueous lithium battery is shown in FIG. 1. The lithium battery 1 comprises a battery case 10 with an electrode assembly 8 including a positive electrode 2, a negative electrode 4, and a separator 6 between the positive and negative electrodes inside. An electrolyte 26 is injected into the battery case 10 and impregnated into the separator 6 which is made of a material such as polyethylene, polypropylene, or multilayered polyethylene/polypropylene. The upper part of the case 10 is sealed with a cap plate 12 and a sealing gasket 14. The cap plate 12 has a safety vent 16 to release pressure. A positive electrode tab 18 and a negative electrode tab 20 are respectively attached to the positive electrode 2 and the negative electrode 4. Insulators 22 and 24 are installed on the lower part and the side part of the electrode assembly 8 between the electrode assembly 8 and the battery case 10 to prevent a short circuit occurrence in the battery.

In a lithium battery, the temperature of the battery increases abruptly on an overcharge condition which can occur due to incorrect operation or break-down of the battery, or a short circuit occurrence due to a defect in battery design. Such a condition can lead to thermal runaway. During overcharge, an excessive amount of lithium ions are released from the positive electrode and deposited on the surface of the negative electrode to render the positive and negative electrodes unstable. As a result, exothermic reactions such as pyrolysis of the electrolyte, reactions between the electrolyte and lithium, oxidation reactions of the electrolyte on the positive electrode, reactions between the electrolyte and oxygen gas that is generated from the pyrolysis of the positive active material, etc., may rapidly increase the temperature inside the battery to cause thermal runaway, and thus, the generation of fire and smoke.

An electrolyte for a lithium battery of the present invention can improve safety at overcharge by including an additive selected from the group consisting of the compounds represented by the following formulas (1) to (7):

(1)

(2)

(3)

(4)

(5)

(6)

(7)

where X is NR where R is H or a $C_1$ to $C_5$ alkyl, S, O, $SO_2$, or SO; and Y is H, a halogen, a $C_1$ to $C_5$ alkyl, an alkoxy, or a $C_6$ to $C_{10}$ aryl.

Exemplary compounds of the formulas (1) to (7) include 4-(4-fluoro-phenoxy)-[1,3]dioxolan-2-one of formula (8), 4-phenylsulfanyl-[1,3]dioxolan-2-one) of formula (9), and 4-benzenesulfonyl-[1,3]dioxolan-2-one of formula (10), and so on:

(8)

(9)

(10)

The additive of the compound represented by the formulas (1) to (7) improves the safety of a lithium battery by initiating a polymerization reaction at a voltage of more than about 4.5V. The resulting polymer coats surfaces of the electrodes resulting in an increase in resistance between the positive electrode and the negative electrode. Alternatively, the addition of such a compound causes oxidation and reduction reactions at a voltage of more than about 4.5V resulting in a consumption of the current which is applied at overcharge.

The additive is added in an amount of 0.01 to 50 wt %, preferably 0.5 to 10 wt %, and more preferably 1 to 5 wt % based on the total amount of the electrolyte. The addition effect is not realized sufficiently when the compound is used in an amount less than 0.01 wt %, and the cycle life characteristics of the battery are decreased when the compound is used in an amount exceeding 50 wt %.

An electrolyte including the above additive may also include a lithium salt and a non-aqueous organic solvent. The lithium salt acts as a source of lithium ions in the battery, making the basic operation of a lithium battery possible. The non-aqueous organic solvent acts as a medium in which ions capable of participating in the electrochemical reaction are mobilized.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), LiCl, and LiI.

The concentration of the lithium salt preferably ranges from 0.6 to 2.0 M, and more preferably from 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase of the electrolyte viscosity.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include n-methyl acetate, n-ethyl acetate, n-propyl acetate, etc.

In one embodiment, it is advantageous to use a mixture of a chain carbonate and a cyclic carbonate as the solvent. The cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, electrolyte performance may be enhanced.

In addition, the electrolyte of the present invention may further include mixtures of the carbonate solvents and aromatic hydrocarbon solvents of Formula (11):

(11)

where R1 is a halogen or a $C_1$ to $C_{10}$ alkyl, and q is an integer from 0 to 6.

In one embodiment of the present invention, the electrolyte is prepared by adding a lithium salt and an additive to a non-aqueous solvent. It is usual to add an additive to a non-aqueous solvent in which lithium salt is dissolved, but the addition order of lithium salt and the additive is not important to the present invention.

According to another embodiment of the present invention, a lithium battery is provided that includes the electrolyte. The lithium battery of the present invention uses a material that is capable of reversible intercalation/deintercalation of the lithium ions (a "lithiated intercalation compound") or a material that is capable of reversibly forming a lithium-containing compound as a positive active material, and a lithium metal, or a carbonaceous material that is capable of reversible intercalation/deintercalation of the lithium ions as a negative active material. A lithium secondary battery is prepared by the following process.

First, at least one additive selected from the group consisting of the compounds of Formulas (1) to (7) is added to a lithium salt-containing organic solution to prepare an electrolyte solution.

A negative electrode and a positive electrode are fabricated by conventional processes. A separator of an insulating resin with a network structure is then interposed between the negative electrode and the positive electrode. The whole is wound or stacked to fabricate an electrode assembly, and then the electrode assembly is inserted into a battery case and sealed.

The separator may be a polyethylene or polypropylene monolayered separator, a polyethylene/polypropylene double layered separator, a polyethylene/polypropylene/polyethylene three-layered separator, or a polypropylene/polyethylene/polypropylene three-layered separator. A schematic drawing illustrating the structure of the lithium battery prepared by the above process is shown in FIG. 1.

The electrolyte of the present invention can be applied to all types of lithium batteries, including lithium primary batteries and lithium secondary batteries.

The lithium secondary battery can realize significant overcharge protection properties compared to batteries using conventional non-aqueous electrolytes.

The following examples further illustrate the present invention in detail, but are not to be construed to limit the scope thereof.

COMPARATIVE EXAMPLE 1

$LiCoO_2$ having an average particle diameter of 10 μm as a positive active material, Super P (acetylene black) as a conductive agent, and polyvinylidene fluoride (PVdF) as a binder were mixed in a weight ratio of 94:3:3 in N-methyl-2-pyrrolidone (NMP) to prepare a positive active material slurry. The slurry was coated onto aluminum foil, dried, and compressed by a roll press, thus manufacturing a positive electrode having a width of 4.9 cm and a thickness of 147 μm.

Mesocarbon fiber (MCF from Petoca company) as a negative active material, oxalic acid, and PVdF as a binder were mixed in a weight ratio of 89.8:0.2:10 to prepare a negative active material slurry. The slurry was coated onto copper foil, dried, and compressed by a roll press, thus manufacturing a negative electrode having a width of 5.1 cm and a thickness of 178 μm.

Between the manufactured positive and negative electrodes, a polyethylene porous film separator was interposed and the construction was wound to fabricate an electrode assembly. The electrode assembly was placed into a battery case and 2.3 g of liquid electrolyte was injected into the case under pressure, thus completing the fabrication of the lithium secondary battery cell. For the electrolyte, a 1.3M $LiPF_6$ solution of a mixed solvent of ethylene carbonate, ethylmethyl carbonate, propylene carbonate, and fluorobenzene in a volume ratio of 30:55:5:10 was used.

EXAMPLE 1

A battery cell was prepared by the same method as in Comparative Example 1, except that a liquid electrolyte was prepared by adding 0.15 g of 4-phenylsulfanyl-[1,3]dioxolan-2-one to a 1.3M $LiPF_6$ solution of a mixed solvent of ethylene carbonate, ethylmethyl carbonate, propylene carbonate, and fluorobenzene in a volume ratio of 30:55:5:10. Then, 2.3 grams of the electrolyte was injected into a battery case.

EXAMPLE 2

A battery cell was prepared by the same method as in Comparative Example 1, except that a liquid electrolyte was prepared by adding 0.25 g of 4-(4-fluoro-phenoxy)-[1,3]dioxolan-2-one to a 1.3M $LiPF_6$ solution of a mixed solvent of ethylene carbonate, ethylmethyl carbonate, propylene carbonate, and fluorobenzene in volume ratio of 30:55:5:10. Then, 2.3 grams of the electrolyte was injected into a battery case.

EXAMPLE 3

A battery cell was prepared by the same method as in Comparative Example 1, except that a liquid electrolyte was prepared by adding 0.25 g of 4-(4-benzenesulfonyl-[1,3]dioxolan-2-one to a 1.3M $LiPF_6$ solution of a mixed solvent of ethylene carbonate, ethylmethyl carbonate, propylene carbonate, and fluorobenzene in a volume ratio of 30:55:5:10. Then, 2.3 grams of the electrolyte was injected into a battery case.

EXAMPLE 4

Preparation of
4-Phenylsulfanyl-[1,3]dioxolane-2-one

4-Phenylsulfanyl-[1,3]dioxolane-2-one was synthesized with reference to "Electrolytic partial fluorination of organic compound. Part: 53☆ Highly regioselective anodic mono- and difluorination of 4-arylthio-1,3-dioxolan-2-ones. A marked solvent effect on fluorinated product selectivity", Ishii, H.; Yamada, N.; Fuchigami, T., Tetrahedron 2001, 57, 9067-9072 (which is incorporated herein by reference) according to the following procedure.

In 70 mL of tetrahydrofuran (THF), 3 g of vinylene carbonate and 5.1 g of benzenethiol were dissolved, and then 4.7 g of triethylamine was added. The mixture was refluxed under an argon atmosphere for 4 hours. When the reaction was finished, the solvent was removed through distillation under reduced pressure, and the resulting material was subjected to the column chromatography on silica gel (eluted with 20% hexane/ethylacetate) and purified to obtain a target product, 4-phenylsulfanyl-[1,3]dioxolan-2-one.

Using the 4-phenylsulfanyl-[1,3]dioxolan-2-one, a battery cell was prepared by the same method as in Comparative Example 1.

EXAMPLE 5

Preparation of
4-(4-Fluoro-phenoxy)-[1,3]dioxolan-2-one

In 70 mL of tetrahydrofuran (THF), 3 g of vinylene carbonate and 5.1 g of benzenethiol were dissolved, and then 4.7 g of triethylamine was added. The mixture was refluxed under an argon atmosphere for 48 hours. When the reaction was finished, the solvent was removed through distillation under reduced pressure, and the resulting material was subjected to the column chromatography on silica gel (eluted with 20% hexane/ethylacetate) and purified to obtain a target product, 4-(4-fluoro-phenoxy)-[1,3]dioxolan-2-one.

Using the 4-(4-fluoro-phenoxy)-[1,3]dioxolan-2-one, a battery cell was prepared by the same method as in Comparative Example 1.

EXAMPLE 6

Preparation of 4-Benzenesulfonyl-[1,3]dioxolan-2-one

4-Phenylsulfanyl-[1,3]dioxolan-2-one) was dissolved in methanol, and OXONE® was added. The resulting mixture was agitated at room temperature for 5 minutes and water was added. The obtained reaction mixture was agitated at room temperature for 12 hours. From the agitated reaction mixture, methanol was removed using decompression distillation and the resulting product was extracted using methylene chloride. The extracted organic solvent layer was again extracted using water, moisture was removed using magnesium sulfate, and then organic solvent was removed using decompression distillation. Using silica gel chromatography, separation and purification were performed to obtain a pure target product, 4-benzenesulfonyl-[1,3]dioxolan-2-one.

Using the 4-benzenesulfonyl-[1,3]dioxolan-2-one, a battery cell was prepared by the same method as in Comparative Example 1.

The prismatic battery cells of Examples 1 and 2 and Comparative Example 1 were charged and discharged at 2C and the capacities were measured. The results are shown in Table 1. The evaluation results of safety at overcharge are also shown in Table 1. In order to evaluate overcharge safety, after each of the lithium ion battery cells were fully discharged, overcharge was performed by charging at a charge current of 2.37 A for about 2.5 hours. The changes of charge voltage and temperature were then measured.

TABLE 1

|  | Standard capacity (mAh) | 2C capacity (mAh) | Overcharge safety |
|---|---|---|---|
| Example 1 | 826 | 785 | No ignition |
| Example 2 | 805 | 763 | No ignition |
| Comparative Example 1 | 828 | 805 | ignition |

As shown in Table 1, the battery cells of Examples 1 and 2 showed excellent safety at overcharge compared with that of Comparative Example 1, while not decreasing the 2C capacity.

Figure 2:
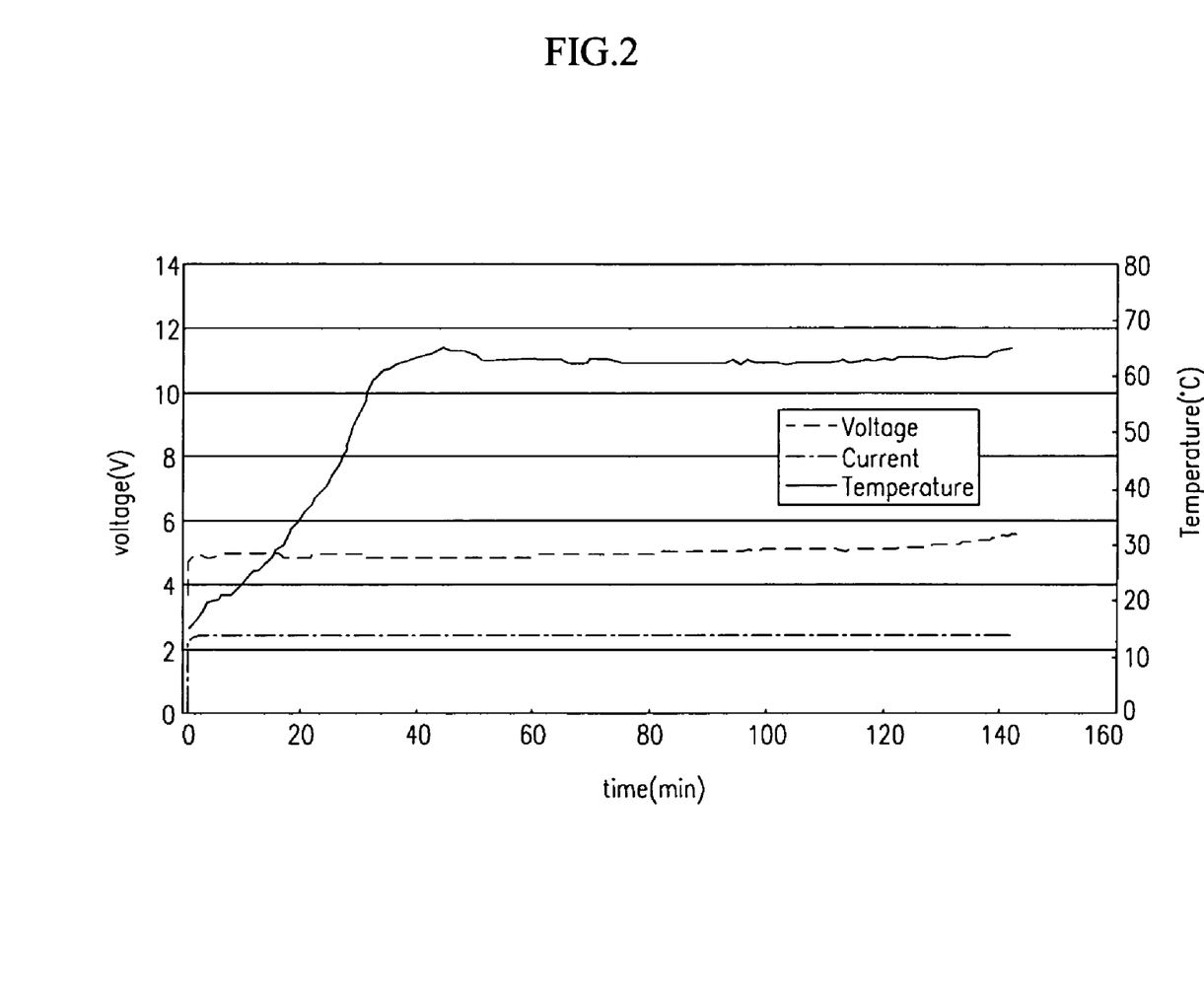
FIG. 2 is a graph illustrating current, cell temperature, and voltage for the battery cell of Example 1 of the present invention when overcharged at 12V.
Figure 3:
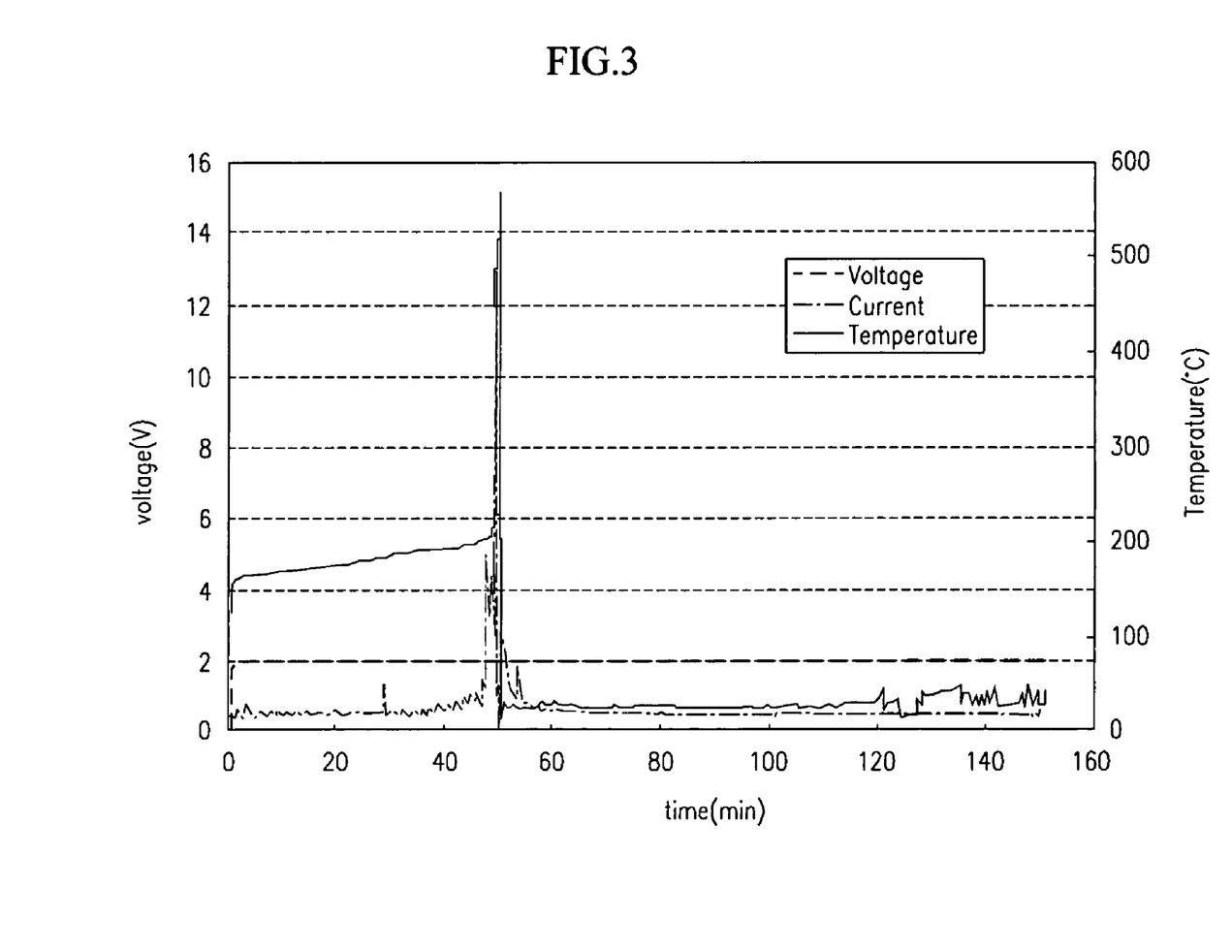
FIG. 3 is a graph illustrating current, cell temperature, and voltage for the battery cell of Comparative Example 1 when overcharged at 12V.

FIGS. 2 and 3 are graphs showing current, temperature, and voltage characteristics when the battery cells of Example 1 and Comparative Example 1 were overcharged at 2.37A and 2.0A, respectively, to 12V. As shown in FIG. 2, the battery cell of Example 1 shows good safety by maintaining voltage at overcharge. It is expected that the additive of Example 1 plays a role in preventing increase of voltage to a certain value as a redox shuttle. On the contrary, as shown in FIG. 3, the temperature for Comparative Example 1 rose abruptly, and the voltage dropped to 0 V at 12 V upon overcharging, showing evidence of a short circuit.

As described above, the electrolyte including additives can improve safety while maintaining capacity at overcharge.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a lithium battery, comprising:
   a non-aqueous organic solvent;
   a lithium salt; and
   an additive provided in an amount from 0.01 to 50 wt % selected from the group consisting of compounds represented by the following formula and combinations thereof, where each of $Z^1$, $Z^2$ and $Z^3$ is independently selected from O and S, except that where $Z^2$ and $Z^3$ are O, then $Z^1$ is O, X is selected from the group consisting of NR where R is hydrogen or a $C_1$ to $C_5$ alkyl, S, O, $SO_2$, and SO; and Y is selected from the group consisting of hydrogen, halogens, $C_1$ to $C_5$ alkyls, alkoxys, and $C_6$ to $C_{10}$ aryls.

2. The electrolyte for a lithium battery according to claim 1, wherein the additive is selected from the group consisting of compounds represented by formulas (8) to (10):

(8)

(9)

(10)

3. The electrolyte for a lithium battery according to claim 1, wherein the additive is provided in an amount from 0.1 to 50 wt %.

4. The electrolyte for a lithium battery according to claim 3, wherein the additive is provided in an amount from 0.5 to 10 wt %.

5. The electrolyte for a lithium battery according to claim 1, wherein the lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, LiAlCl$_4$, LiN(C$_x$F$_{2x+1}$SO$_2$)(C$_y$F$_{2y+1}$SO$_2$) where x and y are natural numbers, LiCi, LiI and combinations thereof.

6. The electrolyte for a lithium battery according to claim 1, wherein the lithium salt is used in a concentration ranging from 0.7 to 2.0 M.

7. The electrolyte for a lithium battery according to claim 1, wherein the non-aqueous organic solvent is selected from the group consisting of carbonates, esters, ethers, ketones, and combinations thereof.

8. The electrolyte for a lithium battery according to claim 7, wherein the carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

9. The electrolyte for a lithium battery according to claim 7, wherein the electrolyte comprises a mixed solvent of a cyclic carbonate and a chain carbonate.

10. The electrolyte for a lithium battery according to claim 1, wherein the electrolyte comprises a mixed solvent of a carbonate solvent and an aromatic hydrocarbon solvent.

11. The electrolyte for a lithium battery according to claim 10, wherein the aromatic hydrocarbon solvent is a compound of Formula (11):

(11)

where R1 is selected from the group consisting of halogens and C$_1$ to C$_{10}$ alkyls; and q is an integer from 0 to 6.

12. The electrolyte for a lithium secondary battery according to claim 11, wherein the aromatic hydrocarbon solvent is selected from the group consisting of benzene, fluorobenzene, toluene, trifluorotoluene, xylene and combinations thereof.

13. The electrolyte for a lithium secondary battery according to claim 10, wherein the carbonate solvent and the aromatic hydrocarbon solvent are mixed in a volume ratio from 1:1 to 30:1.

14. A lithium battery comprising:
an electrolyte comprising a non-aqueous organic solvent, a lithium salt, and an additive provided in an amount from 0.01 to 50 wt % selected from the group consisting of the compounds of the following formula and combinations thereof;

where each of Z$^1$, Z$^2$ and Z$^3$ is independently selected from O and S, except that where Z$^2$ and Z$^3$ are O, then Z$^1$ is O, X is selected from the group consisting of NR where R is hydrogen or a C$_1$ to C$_5$ alkyl, S, O, SO$_2$, and SO; and Y is selected from the group consisting of hydrogen, halogens, C$_1$ to C$_5$ alkyls, alkoxys, and C$_6$ to C$_{10}$ aryls;

a positive electrode including a positive active material that can intercalate and deintercalate lithium ions; and a negative electrode including a positive active material which can intercalate and deintercalate lithium ions.

15. The lithium battery according to claim 14, wherein the additive is selected from the group consisting of the compounds represented by formulas (8) to (10):

(8)

(9)

(10)

16. The lithium battery according to claim 14, wherein the additive is present in an amount from 0.1 to 50 wt %.

17. The lithium battery according to claim 16, wherein the additive is present in an amount from 0.5 to 10 wt %.

18. The lithium battery according to claim 14, wherein the lithium salt is selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlCl$_4$, LiN(C$_x$F$_{2x+1}$SO$_2$)(C$_y$F$_{2y+1}$SO$_2$) where x and y are natural numbers, LiCl, LiI and combinations thereof.

19. The lithium battery according to claim 14, wherein the lithium salt is present in an amount from 0.7 to 2.0 M.

20. The lithium battery according to claim 14, wherein the non-aqueous organic solvent is selected from the group consisting of carbonates, esters, ethers, ketones and combinations thereof.

21. The lithium battery according to claim 20, wherein the carbonate is selected from the group consisting of dimethyl carbonate (DMC), diethyl carbonate (DEC), dipropyl carbonate (DPC), methylpropyl carbonate (MPC), ethyipropyl carbonate (EPC), methylethyl carbonate (MEC), ethylene carbonate (BC), propylene carbonate (PC), and butylene carbonate (BC).

22. The lithium battery according to claim 20, wherein the electrolyte comprises a mixed solvent of a cyclic carbonate and a chain carbonate.

23. The lithium battery according to claim 14, wherein the electrolyte comprises a mixed solvent of a carbonate solvent and an aromatic hydrocarbon solvent.

24. The lithium battery according to claim 23, wherein the aromatic hydrocarbon solvent is a compound of Formula (11):

(11)

where R1 is selected from the group consisting of halogens and $C_1$ to $C_{10}$ alkyls, and q is an integer from 0 to 6.

25. The lithium secondary battery according to claim 24, wherein the aromatic hydrocarbon solvent is selected from the group consisting of benzene, fluorobenzene, toluene, trifluorotoluene, xylene and combinations thereof.

26. The lithium secondary battery according to claim 23, wherein the carbonate solvent and the aromatic hydrocarbon solvent are mixed in a volume ratio from 1:1 to 30:1.

* * * * *